United States Patent
Fu et al.

(10) Patent No.: US 11,281,446 B2
(45) Date of Patent: Mar. 22, 2022

(54) UPDATING METHOD, TERMINAL AND ELECTRONIC DEVICE

(71) Applicant: BEIJING BAIDU NETCOM SCIENCE AND TECHNOLOGY CO., LTD., Beijing (CN)

(72) Inventors: Shengbo Fu, Beijing (CN); Huayong Wang, Beijing (CN); Feilong Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 48 days.

(21) Appl. No.: 16/711,111

(22) Filed: Dec. 11, 2019

(65) Prior Publication Data
US 2020/0409683 A1  Dec. 31, 2020

(30) Foreign Application Priority Data
Jun. 27, 2019  (CN) .......................... 201910566990.8

(51) Int. Cl.
| | |
|---|---|
| G06F 8/65 | (2018.01) |
| G06F 21/54 | (2013.01) |
| G06F 21/57 | (2013.01) |
| G06F 21/62 | (2013.01) |

(52) U.S. Cl.
CPC ............... *G06F 8/65* (2013.01); *G06F 21/54* (2013.01); *G06F 21/57* (2013.01); *G06F 21/62* (2013.01)

(58) Field of Classification Search
None
See application file for complete search history.

(56) References Cited

U.S. PATENT DOCUMENTS

| | | | | |
|---|---|---|---|---|
| 7,490,066 | B2* | 2/2009 | Kronenberg | H04L 41/069 705/50 |
| 10,496,397 | B2* | 12/2019 | Lodeiro | G06F 8/65 |
| 10,637,657 | B2* | 4/2020 | Haga | H04L 63/062 |
| 2014/0298484 | A1* | 10/2014 | Sung | G06F 21/6245 726/27 |
| 2017/0134164 | A1* | 5/2017 | Haga | G06F 21/572 |
| 2017/0289171 | A1* | 10/2017 | Resch | G06F 3/067 |
| 2018/0060057 | A1* | 3/2018 | Dake | G06F 8/65 |
| 2020/0252405 | A1* | 8/2020 | Sankavaram | H04L 63/102 |

OTHER PUBLICATIONS

Microsoft, "How heartbeats work in Operations Manager", 2018, Microsoft at https://docs.microsoft.com/en-us/system-center/scom/manage-agent-heartbeat-overview?view=sc-om-2019 (Year: 2018).*
Cassandra-v3.11.3, "Adding, replacing, moving and removing nodes", 2018, Published at https://murukeshm.github.io/cassandra/3.11.3/operating/topo_changes.html (Year: 2018).*
Cassandra-date, "index of /dist/cassandra", 2021, Published by Cassandra (Year: 2021).*

* cited by examiner

*Primary Examiner* — Hossain M Morshed
(74) *Attorney, Agent, or Firm* — Lathrop GPM LLP (57) ABSTRACT

The present disclosure provides an updating method, a terminal and an electronic device. The updating method may include: acquiring updated authority information; and transmitting a first update notification to a first data node, the first update notification comprising the updated authority information. When a control node transmits the first update notification to the first data node, such notification includes the updated authority information.

9 Claims, 5 Drawing Sheets

UPDATING METHOD, TERMINAL AND ELECTRONIC DEVICE

CROSS-REFERENCE TO RELATED APPLICATIONS

This application claims priority to Chinese Patent Application No. 201910566990.8, filed with the China National Intellectual Property Administration (CNIPA) on Jun. 27, 2019, the contents of which are incorporated herein by reference in their entirety.

TECHNICAL FIELD

The present disclosure relates to the field of computer technology, in particular to an updating method, a terminal and an electronic device.

BACKGROUND

A storage system provides a basic data storage function, not only to ensure the correctness and stability of user data, but also to manage authority information, especially the consistency of authority information. In a distributed storage system, alternation between data nodes and data migration are normal, and a user side also has various operations such as modifying a user authority. It is also common for a data node to have machine failures and network anomalies, which will result in inconsistent authority information. Therefore, update of the authority information is especially important. At present, when a data node updates the authority information, the updating process is cumbersome and the updating efficiency is low.

SUMMARY

Embodiments of the present disclosure provides an updating method and apparatus, and device, to solve the problem of low updating efficiency during a data node updating authority information.

In a first aspect, some embodiments of the present disclosure provide an updating method, applied to a control node, including:

acquiring updated authority information; and transmitting a first update notification to a first data node, the first update notification including the updated authority information.

In a second aspect, some embodiments of the present disclosure provide an updating method, applied to a data node, including:

receiving a first update notification from a control node, the first update notification comprising updated authority information; and updating according to the first update notification.

In a third aspect, some embodiments of the present disclosure provide a terminal, the terminal being a control node, including:

an acquisition module, configured for acquiring updated authority information; and a first transmitting module, configured for transmitting a first update notification to a first data node, the first update notification comprising the updated authority information.

In a fourth aspect, some embodiments of the present disclosure provide a terminal, the terminal being a data node, including:

a receiving module, configured for receiving a first update notification from a control node, the first update notification comprising updated authority information; and an updating module, configured for updating according to the first update notification.

In a fifth aspect, some embodiments of the present disclosure provide an electronic device, including a processor, a memory and a computer program stored in the memory and operable in the processor, where the computer program, when executed by the processor, implements steps of the updating method according to the first aspect, or the computer program, when executed by the processor, implements steps of the updating method according to the second aspect.

In a sixth aspect, some embodiments of the present disclosure provide a computer readable storage medium storing a computer program, where the computer program, when executed by a processor, implements steps of the updating method according to the first aspect, or the computer program, when executed by the processor, implements steps of the updating method according to the second aspect.

The method according to the embodiments acquires updated authority information, and transmits a first update notification to a first data node, the first update notification including the updated authority information. When the control node sends the first update notification to the first data node, the updated authority information is included. Thus, when the first data node receives the first update notification, may acquire the updated authority information directly from the first update notification and performs the update, thereby simplifying the updating process and improving the updating efficiency.

BRIEF DESCRIPTION OF THE DRAWINGS

In order to more clearly describe the technical solutions of the embodiments of the present disclosure, the accompanying drawings used in the description of the embodiments of the present disclosure will be briefly described below. Apparently, the accompanying drawings described below are only some embodiments of the present disclosure. Those of ordinary skill in the art may obtain other accompanying drawings according to such accompanying drawings without creative work.

DETAILED DESCRIPTION OF EMBODIMENTS

Embodiments of present disclosure will be described below in detail with reference to the accompanying drawings. Apparently, the embodiments described are only some embodiments, but not all embodiments, of the present disclosure. On the basis of the embodiments of the present disclosure, all other embodiments obtained by those of ordinary skill in the art without creative work fall within the scope of protection of the present disclosure.

Figure 1:
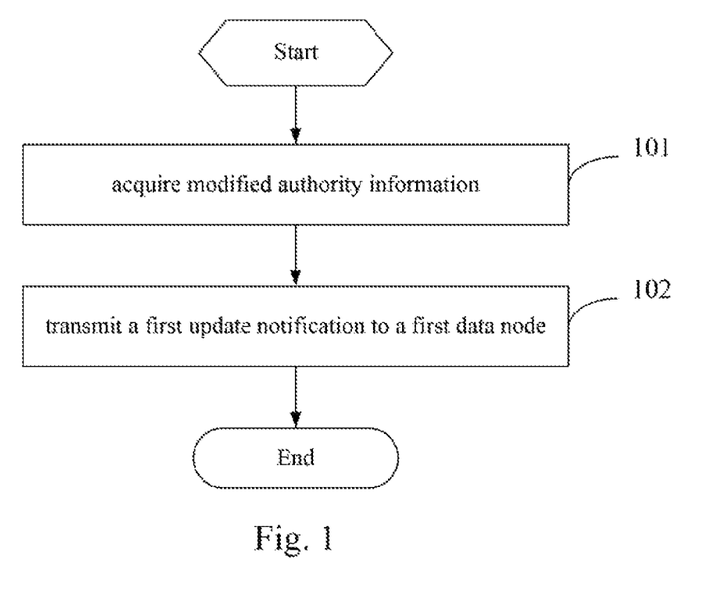
FIG. 1 is a first flow diagram of an updating method according to an embodiment of the present disclosure.

Referring to FIG. 1, a first flowcharts of an updating method according to an embodiment of the present disclosure is shown. As shown in FIG. 1, the embodiment of the present disclosure provides an updating method applied to a control node, the method comprising the following steps:

Step 101: acquiring updated authority information.

The updated authority information may be transmitted by a user. For example, in the case the user needs to modify authority information, the user transmits an update request to the control node, the update request including the updated/modified authority information. The updated/modified authority information may also be transmitted by a data node. For example, the user transmits an update request to the data node, and the data node transmits the update request to the control node.

Step 102: transmitting a first update notification to a first data node, the first update notification comprising the updated/modified authority information.

Specifically, the first update notification is used to notify the data node to update according to the updated/modified authority information. The control node (also refer to master node), when notifying the first data node to update authority information, transmits a first update notification to the first data node, the first update notification including the updated/ modified authority information. The first data node, after receiving the first update notification, may update according to the updated/modified authority information carried in the first update notification. In this case, the first data node does not need to acquire updated authority information from a file system, thereby simplifying the updating process and improving the updating efficiency.

The updating method according to the present embodiment includes: acquiring updated/modified authority information; and transmitting a first update notification to the first data node, the first update notification comprising the updated authority information. When the control node transmits the first update notification to the first data node, such notification includes the updated/modified authority information. Therefore, the first data node, after receiving the first update notification, may directly acquire the updated/modified authority information from the first update notification, and then perform the updating, thereby simplifying the updating process and improving the updating efficiency.

Figure 2:
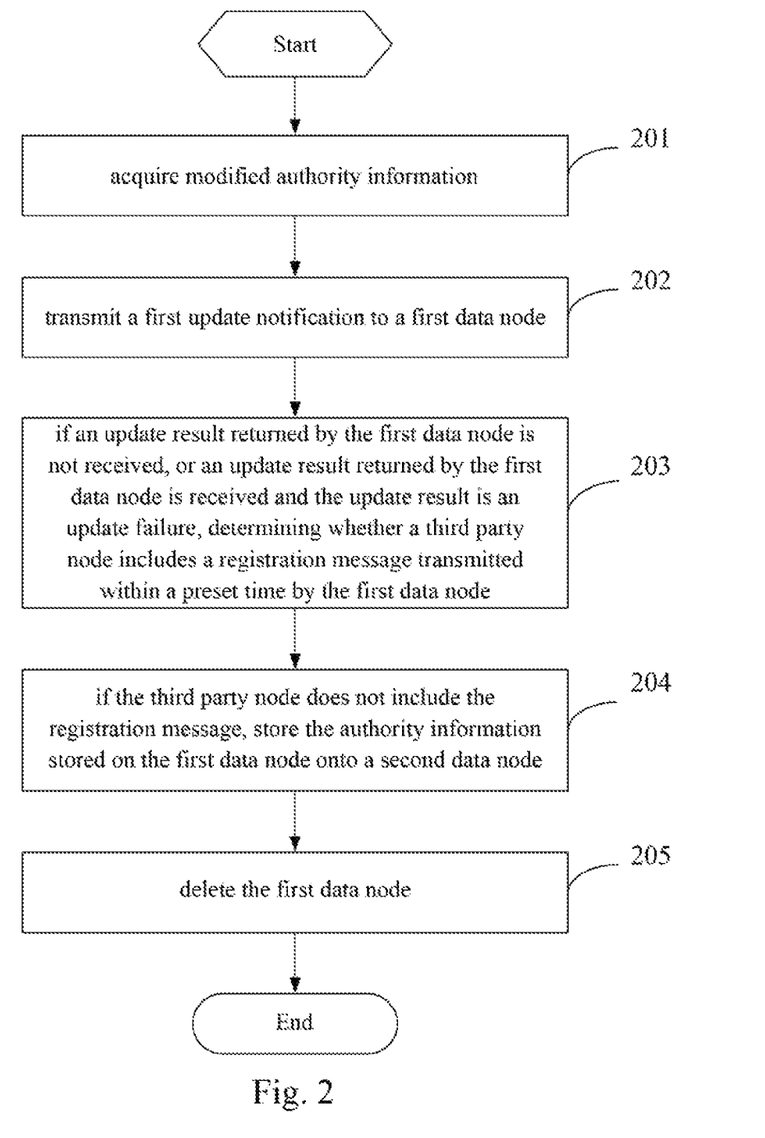
FIG. 2 is a second flow diagram of an updating method according to an embodiment of the present disclosure.

Referring to FIG. 2, a second flowchart of an updating method according to an embodiment of the present disclosure is shown. As shown in FIG. 2, the present disclosure provides an updating method applied to a control node, the method comprising the following steps:

Step 201: acquiring updated/modified authority information of update.

The updated authority information may be transmitted by a user. For example, in the case the user needs to modify authority information, the user transmits an update request to the control node, the update request comprising the updated authority information. The updated authority information may also be transmitted by a data node. For example, the user transmits an update request to the data node, and the data node transmits the update request to the control node.

Step 202: transmitting a first update notification to a first data node, the first update notification comprising the updated authority information.

Specifically, the control node (also refer to master node), when notifying the first data node to update authority information, transmits a first update notification to a first data node, the first update notification including the updated authority information. The first data node, after receiving the first update notification, may update according to the updated authority information carried in the first update notification. In this case, the first data node does not need to acquire updated authority information from other nodes.

Step 203: in response to not receiving an update result returned by the first data node, or receiving an update result returned by the first data node and the update result being an update failure, determining whether a third party node include a registration message transmitted by the first data node within a preset time.

Specifically, the update result is a result that the first data node updates according to the first update notification. The update result includes an update success and an update failure.

The first data node updates according to the updated authority information carried in the first update notification, and transmits an update result to the control node.

The control node, after receiving the update result, may know whether the first data node updates successfully or not according to the update result. If the update result received by the control node is the update success, the first data node has completed the update of the authority information. If the update result received by the control node is the update failure, the first data node does not complete the update of the authority information.

If a communication between the control node and the first data node is abnormal, for example, the control node does not transmit the first update notification to the first data node, or the first data node does not transmit the update result to the control node successfully. in both cases the control node cannot receive the update result returned by the first data node. For the first case, the first data node does not update successfully; and for the second case, the first data node may or may not update successfully.

According to the analysis above, when the update result received by the control node from the first data node is the update success, it may be determined that the first data node and the control node have consistent authority information. In other cases, for example, when the control node does not receive the update result returned by the first data node, whether the communication is abnormal or the first data node is abnormal is not sure; or, after receiving the update result returned by the first data node and the update result is the update failure, the control node is not sure whether the reason for the update failure is the abnormal first data node.

In order to determine whether the first data node is abnormal, the control node may make a judgment according to a third party node. The first data node will transmit a registration message to the third party node periodically (which may be understood as at a preset interval, for example, 2 minutes or 3 minutes), and the registration message may be used to inform the third party node that the first node is a normal node. The control node may assist the determining whether the first data node is abnormal by determining whether the third party node receives a registration message from the first data node recently (i.e., within a preset time, for example, 5 minutes or 8 minutes). For instance, if the control node does not receive the update result returned by the first data node, and the control node learns through the third party node that the third party node does not include a registration message transmitted within the preset time by the first data node, the first data node may be determined as abnormal. If the control node receives the update result returned by the first data node, and the update result is the update failure, the control node learns through the third party node that the third party node does not include a registration message transmitted within the preset time by the first data node, the first data node may be determined as abnormal.

That the control node learns, through the third party node, whether the third party node includes a registration message transmitted within the preset time by the first data node may be as follows specifically: the control node transmits a query request to the third party node, the query request comprising an identifier of the first data node; and the third party node, after receiving the query request, queries the registration message of the first data node according to the identifier of the first data node, acquires the transmitting time of the registration message newly received from the first data node, determines whether the transmitting time is within the preset time, and transmits a determination result to the control node.

Alternatively, the control node transmits a query request to the third party node, the query request includes an identifier of the first data node; and the third party node, after receiving the query request, filters the registration message received within the preset time, and transmits to the control node a screening result indicating whether there is the existence of the registration message transmitted by the first data node.

The method in which the control node learns, through the third party node, whether the third party node includes the registration message transmitted within the preset time by the first data node is not limited to the two types above, and may be flexibly selected, which is not limited here.

Step 204: if the third party node does not include a registration message, storing authority information stored on the first data node onto a second data node.

If the third party node does not include the registration message, the first data node may be determined as abnormal. If the third party node includes the registration message, the first data node may be normal. At this time, the control node may transmit the first update notification to the first data node again, so that the first data node updates the authority information, thereby achieving the purpose of ensuring consistent authority information of the control node and the first data node.

If the third party node does not include the registration message, the first data node is determined as abnormal, and the authority information stored on the first data node is stored onto the second data node. That is, the authority information stored on the first data node is migrated to the second data node, so as to avoid the abnormal first data node from resulting in inconsistent authority information and thus affecting user data security. After the authority information stored on the second data node is stored onto the second data node, the control node may transmit the first update notification to the second data node so as to update the authority information of the second data node.

Step 205: deleting the first data node.

The first data node is an abnormal node, and the authority information stored on the first data node is stored onto the second data node. At this time, the first data node may be deleted. Deleting the first data node may be understood as stopping the first data node from serving the outside.

Since the authority information of all data nodes is stored in the control node, when storing the authority information stored on the first data node onto the second data node, the authority information stored on the first data node may be obtained from the control node. The step of storing the authority information stored on the first data node onto the second data node may be executed before the step of deleting the first data node, or may be executed after the step of deleting the first data node, which is not limited here.

In the present embodiment, the updated authority information is acquired; the first update notification is transmitted to the first data node, the first update notification including the updated authority information; if the update result returned by the first data node is not received, or the update result returned by the first data node is received and the update result is the update failure, whether the third party node includes the registration message transmitted by the first data node within the preset time is determined; if the third party node does not include the registration message, the authority information stored on the first data node is stored onto the second data node; and the first data node is deleted. The first data node, after receiving the first update notification, may directly acquire the updated authority information from the first update notification, and update, thereby simplifying the updating process and improving the updating efficiency.

In addition, if the update result returned by the first data node is not received, or the update result returned by the first data node is received and the update result is the update failure, whether the first data node is abnormal may be determined by determining whether the third party node includes the registration message transmitted within the preset time by the first data node, and the first data node is deleted in case of an abnormality. That is, the method in the present embodiment may discover and timely delete (or get rid of) an abnormal data node, so as to ensure consistent authority information of the first data node and the control node and to ensure user data security.

Figure 3:
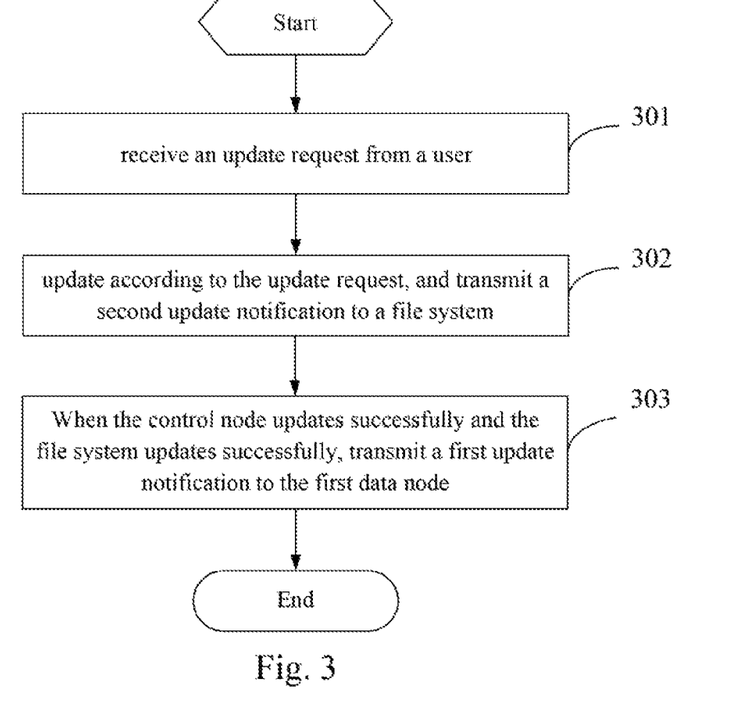
FIG. 3 is a third flow diagram of an updating method according to an embodiment of the present disclosure.

Referring to FIG. 3, a third flowchart of an updating method provided by an embodiment of the present disclosure is shown. As shown in FIG. 3, an embodiment of the present disclosure provide an updating method which is applied to a control node and includes the following steps:

Step 301: receiving an update request from a user, the update request comprising updated authority information.

This step is a specific implementation of step 101.

The updated authority information is transmitted by a user. For example, if the user needs to modify authority information, the user transmits an update request to the control node, the update request comprising the updated authority information.

Step 302: updating according to the update request, and transmitting a second update notification to a file system.

Specifically, the control node receives the update request transmitted by the user, updates authority information stored on the control node according to the update request, and transmits a second update notification to a file system, and the file system updates according to the second update notification. The second update notification may include the updated authority information. The file system stores authority information of a first data node.

The control node transmits the second update notification to the file system to ensure consistency between the authority information stored on the control node and the file system.

If the control node updates successfully but the file system updates unsuccessfully, the authority information of the control node is restored to a state before update, so as to ensure the consistency between the authority information stored on the control node and the file system.

Step 303: when the control node updates successfully and the file system updates successfully, transmitting a first update notification to the first data node.

This step is a specific implementation of step 102.

Specifically, the control node, after receiving the update request transmitted by the user, first updates the authority information stored thereon according to the update request, and transmits a second update notification to the file system. When the control node updates successfully and the file system updates successfully, the first update notification is transmitted to the first data node, which may ensure the consistency between the authority information stored on the control node and the file system before the first update notification is transmitted to the first data node.

In the present embodiment, the update request transmitted by the user is received, the update request including updated authority information; update is performed according to the update request, and the second update notification is transmitted to the file system; and in the case that the control node updates successfully and the file system updates successfully, the first update notification is transmitted to the first data node. The first data node, after receiving the first update notification, may directly acquire the updated authority information from the first update notification, and update, thereby simplifying the updating process and improving the updating efficiency.

Figure 4:
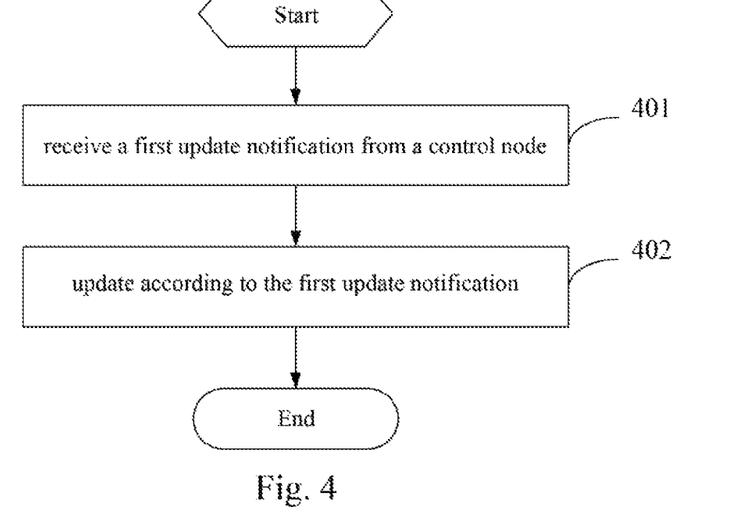
FIG. 4 is a fourth flow diagram of an updating method according to an embodiment of the present disclosure.

Referring to FIG. 4, a fourth flowchart of an updating method according to an embodiment of the present disclosure is shown. As shown in FIG. 4, an embodiment of the present disclosure provides an updating method which is applied to a data node and includes s the following steps:

Step 401: receiving a first update notification from a control node, the first update notification comprising updated authority information.

The updated authority information may be transmitted by a user. For example, if the user needs to modify authority information, the user transmits an update request to the control node, the update request comprising the updated authority information. The updated authority information may also be transmitted by the data node. For example, the user transmits an update request to the data node, and the data node transmits the update request to the control node. The first update notification is used to notify the data node to update according to the updated authority information.

Step 402: updating according to the first update notification.

The data node, after receiving the first update notification, may update according to the updated authority information carried in the first update notification. In this case, the data node does not need to obtain the updated authority information from a file system, thereby simplifying the updating process and improving the updating efficiency.

The updating method according to the present embodiment receives a first update notification from a control node, the first update notification including the updated authority information; and updates according to the first update notification. Therefore, the data node, after receiving the first update notification, may directly acquire the updated authority information from the first update notification, and update, thereby simplifying the update process and improving the update efficiency.

Further, after the updating according to the first update notification, the method includes:
  transmitting an update result to the control node; and
  the updating method further includes:
  transmitting a registration message to a third party node every first preset time.

Specifically, the update result is a result that the data node updates according to the first update notification. The update result includes an update success and an update failure. The data node updates according to the updated authority information carried in the first update notification, and transmits the update result to the control node.

The data node will transmit a registration message to the third party node periodically (for example, every 2 minutes or 3 minutes), and the registration message may be used to inform the third party node that such a node is a normal node.

The control node may assist in determining whether the data node is abnormal by determining whether the third party node receives a registration message from the first data node recently (i.e., within a preset time, for example, 5 minutes or 8 minutes). For instance, if the control node does not receive the update result returned by the data node, and the control node learns through the third party node that the third party node does not include a registration message transmitted within the preset time by the data node, the data node may be determined as abnormal. If the control node receives the update result returned by the data node and the update result is the update failure, and the control node learns through the third party node that the third party node does not include a registration message transmitted within the preset time by the data node, the data node may be determined as abnormal.

The data node transmits a registration message to the third party node every first preset time, and such a message may be used to determine whether the data node is abnormal, so that the control node deletes the abnormal data node when the data node is found to be abnormal, thereby ensuring the consistence between the authority information stored on the first data node and the control node and ensuring user data security.

Further, the updating method in the embodiment shown in FIG. 4 further includes:
  Inspecting a file system every second preset time to confirm whether there is updated authority information; and
    if there is updated authority information in the file system, loading the updated authority information.

In addition to updating authority information according to the first update notification transmitted by the control node, the data node may: inspect the file system periodically (for example, every second preset time which may be 5 minutes or 10 minutes and is not limited herein); determine whether there is updated authority information in the file system; and if so, load the authority information of update for updating.

There are two ways for the data node to update an authority: the data node updates according to the first update notification transmitted by the data node (which may be regarded as passive update); and periodically inspects the file system, and loads updated authority information when the file system includes such updated authority information (which may be regarded as an active update). If the data node updates according to the first update notification and the update fails, the data node may also update by periodically accessing the file system; and if the data node updates by periodically accessing the file system and the update fails, the data node may also update by means of the received first update notification. The two updating methods above may effectively guarantee the consistence between authority information of the data node and the control node, and guarantee the user data security.

Figure 4A:
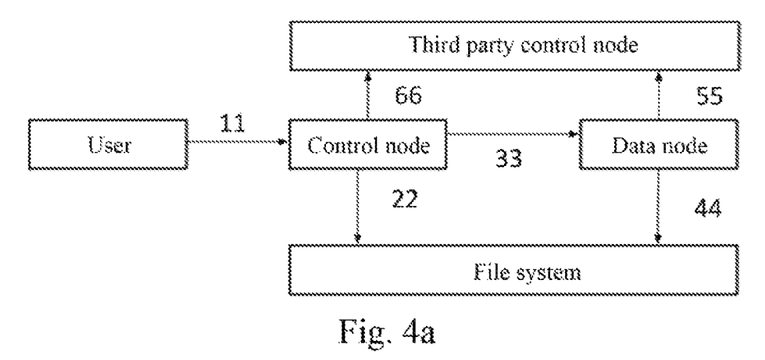
FIG. 4a is a schematic structural diagram of a storage system according to an embodiment of the present disclosure.

The above updating method may be applied to a distributed storage system. As shown in FIG. 4a, the distributed storage system includes a control node, one or more data nodes, a file system and a third party node.

The process of applying the updating method to the distributed storage system is described below.

Step 11: a user transmits an update request to the control node (i.e. master node), wherein the update request includes updated authority information;

Step 22: the control node updates a memory and notifies the file system to perform the update of authority information.

Step 33: the control node transmits an update notification to the data node (i.e., an us node) to notify the data node to perform the update of authority information, the update notification including the updated authority information.

Step 44: the data node periodically inspects the file system (i.e., a File System node), and confirms whether the file system includes an updated authority information;

Step 55: the data node periodically transmits a registration message to the third party node (i.e., a zk node);

Step 66: the control node queries the third party node to confirm whether the registration message of the data node is updated.

Through the update of the authority information in step 22, the update of the memory of the control node and the update of the file system are ensured to be consistent, that is, both the memory of the control node and field system are ensured to be updated successfully. Otherwise, if the file system update fails, the memory of the control node is restored to the state before update, so as to ensure the consistence between the authority information of the control node and the file system.

Through step 33, when the control node notifies the data node to update the authority information, the notification carries the latest authority information. If the communication returns successfully, the data node must be updated to the latest authority information.

Through step 44, the data node checks the authority information of the file system periodically such as every 10 minutes, checks whether authority information is updated, and updates the latest authority information if authority information is updated.

In step 55, the data node periodically registers an update with the third party node (such as a zk node), and the control node accepts an update message. If the control node finds out a data node does not update, then removes this data node, and restores authority information stored on this node onto other data nodes again.

With the implementation above, where the control node and the file system are normal but the data node is abnormal, the abnormal data node may be found out, and ensures that that the authority information loaded for a certain time is the latest authority information, otherwise the abnormal data node will be closed and will not serve the outside until abnormal data is modified to be correct by means of manual intervention.

Figure 5:
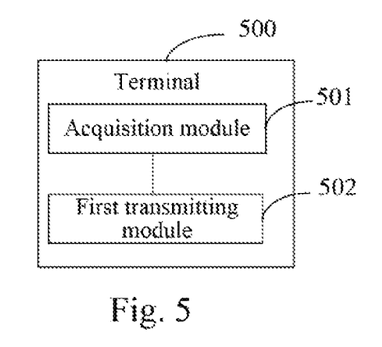
FIG. 5 is a first schematic structural diagram of a terminal according to an embodiment of the present disclosure.

Referring to FIG. 5, a first structural diagram of a terminal according to an embodiment of the present disclosure is shown. As shown in FIG. 5, the present embodiment provides a terminal 500 which is a data node, and includes:

an acquisition module 501, configured to acquire updated authority information;

a first transmitting module 502, configured to transmit a first update notification to a first data node, the first update notification comprising the updated authority information.

Figure 6:
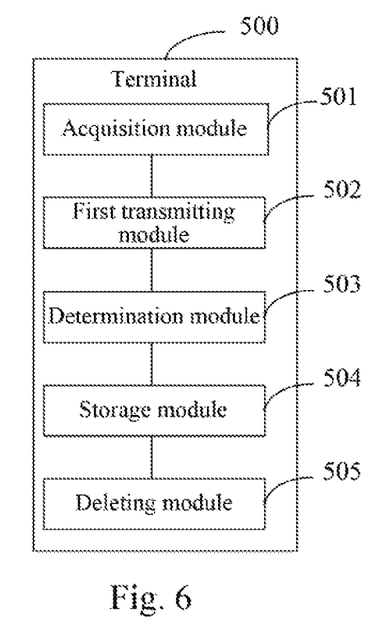
FIG. 6 is a second schematic structural diagram of a terminal according to an embodiment of the present disclosure.

Further, as shown in FIG. 6, the terminal 500 further includes:

a determination module 503, configured to determine whether a third party node includes a registration message transmitted by the first data node within a preset time in response to not receiving an update result returned by the first data node, or receiving an update result returned by the first data node and the update result being an update failure;

a storage module 504, configured to store the authority information stored on the first data node onto a second data node in response to the third party node not comprising the registration message; and a deleting module 505, configured to delete the first data node.

Further, the acquisition module 501 is configured to:

receive an update request from a user, the update request comprising the updated authority information; and the terminal 500 further includes:

a second transmitting module, configured to update according to the update request, and transmitting a second update notification to a file system.

Further, the first transmitting module 502 is configured to:

when the control node updates successfully and the file system updates successfully, transmit the first update notification to the first data node.

The terminal 500 provided by some embodiments of the present disclosure may implement various processes implemented by the control node in the method embodiment shown in FIG. 1. To avoid repetition, details are not described herein again.

The terminal 500 according to the present embodiment acquires updated authority information; and transmits a first update notification to a first data node, the first update notification comprising the updated authority information. When the control node transmits the first update notification to the first data node, such notification includes the updated authority information. Therefore, the first data node, after receiving the first update notification, may directly acquire the updated authority information from the first update notification, and update, thereby simplifying the updating process and improving the updating efficiency.

Figure 7:
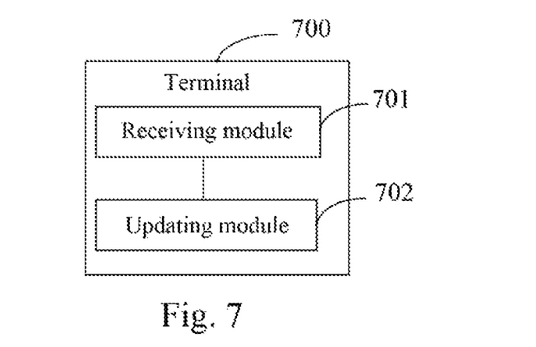
FIG. 7 is a third schematic structural diagram of a terminal according to an embodiment of the present disclosure.

Referring to FIG. 7, a third structural diagram of a terminal provided by an embodiment of the present disclosure is shown. As shown in FIG. 5, the present embodiment provides a terminal 700 which is a data node and includes:

a receiving module 701, configured to receive a first update notification from a control node, the first update notification comprising updated authority information; and an updating module 702, configured to update according to the first update notification.

Further, the terminal 700 includes:

a first transmitting module, configured to transmit an update result to the control node; and a second transmitting module, configured to transmit a registration message to a third party node every first preset time.

Further, the terminal 700 includes:

a confirming module, configured to inspect a file system every second preset time to confirm whether there is updated authority information; and a loading module, configured to load the updated authority information of update in response to there being updated the authority information in the file system.

The terminal 700 according to the present embodiment receives a first update notification transmitted by the control node, the first update notification comprising the updated authority information; and updates according to the first update notification. Therefore, the data node, after receiving the first update notification, may directly acquire the updated authority information from the first update notification, and update, thereby simplifying the update process and improving the update efficiency.

Figure 8:
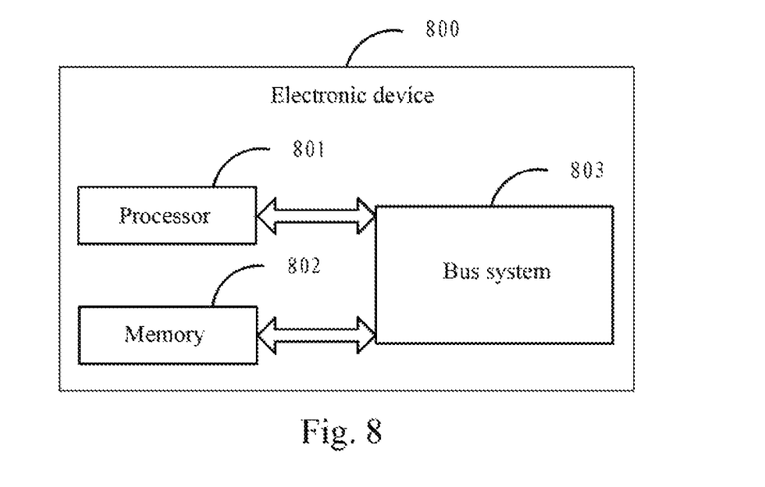
FIG. 8 is a schematic structural diagram of an electronic device according to an embodiment of the present disclosure.

Referring to FIG. 8, a structural diagram of an electronic device provided by an embodiment of the present disclosure is shown. As shown in FIG. 8, the electronic device 800 includes a processor 801, a memory 802 and a computer program, the computer program may be stored in the memory 802 and run in the processor. Components in the electronic device 800 are coupled together by means of a bus system 803. It will be appreciated that the bus system 803 is used to implement connection communication between such components.

In an embodiment of the present disclosure, the processor 801 is configured to acquire updated authority information; and transmitting a first update notification to a first data node, the first update notification comprising the updated authority information.

Further, the processor 801 is configured to determine whether a third party node includes a registration message transmitted by the first data node within a preset time in response to not receiving an update result returned by the first data node, or receiving an update result returned by the first data node and the update result being an update failure;

In response to the third party node not comprising the registration message, storing the authority information stored on the first data node onto a second data node; and deleting the first data node.

Further, the processor 801 is configured to receive an update request from a user, the update request comprising updated authority information of update;

after acquiring the updated authority information and before transmitting a first update notification to the first data node, the processor is also configured to:

update according to the update request, and transmitting a second update notification to a file system.

Further, the processor 801 is also configured to transmit the first update notification to the first data node when the control node updates successfully and the file system updates successfully.

The electronic device 800 may implement various processes implemented by the control node in the embodiments above. To avoid repetition, details are not described herein again.

The electronic device 800 according to the present embodiment acquires updated authority information; and transmits a first update notification to a first data node, the first update notification comprising the updated authority information of update. When the control node transmits the first update notification to the first data node, such notification includes the updated authority information of update. Therefore, the first data node, after receiving the first update notification, may directly acquire the updated authority information from the first update notification, and update, thereby simplifying the updating process and improving the updating efficiency.

In another embodiment of the present disclosure, the processor 801 is configured to receive a first update notification from a control node, the first update notification comprising updated authority information; and updating according to the first update notification.

Further, the processor 801 is also configured to transmit an update result to the control node; and transmitting a registration message to a third party node every first preset time.

Further, the processor 801 is also configured to inspect a file system every second preset time to confirm whether there is updated authority information; and loading the updated authority information of update in response to there being updated authority information in the file system.

The electronic device 800 may implement various processes implemented by the data nodes in the foregoing embodiments. To avoid repetition, details are not described herein again.

The electronic device 800 of the embodiment of the present disclosure receives a first update notification transmitted by a control node; the first update notification includes updated authority information; and updates according to the first update notification. Therefore, the data node, after receiving the first update notification, may directly acquire the updated authority information from the first update notification, and update, thereby simplifying the update process and improving the update efficiency.

An embodiment of the present disclosure also provides a computer readable storage medium. The computer readable storage medium stores a computer program. The computer program, when executed by the processor, implements processes of the embodiments of the updating method and may achieve the same technical effect. To avoid repetition, the storage medium will not be repeated here. The computer readable storage medium includes a read-only memory (ROM), a random access memory (RAM), a magnetic disk or an optical disk.

Those of ordinary skill in the art will appreciate that the elements and algorithm steps of the various examples described in connection with the embodiments disclosed herein may be implemented in electronic hardware or a combination of computer software and electronic hardware. Whether these functions are performed in hardware or software depends on the specific application and design constraints of the technical solution. Those skilled in the art may use different methods for implementing the described functions for each particular application, but such implementation should not be considered to exceed the scope of the present disclosure.

Those skilled in the art may clearly understand that for the convenience and brevity of the description, the specific working process of the system, the device and the unit described above may refer to the corresponding process in the method embodiment above, and details are not described herein again.

It should be understood that the apparatus and method disclosed in the embodiments provided by the present disclosure may be implemented in other methods. For example, the apparatus embodiments described above are merely illustrative. For example, the division of the unit is only a logical function division. In actual implementation, there may be another division method. For example, multiple units or components may be combined or may be integrated into another system, or some features may be ignored or not executed. In addition, the mutual coupling or direct coupling or communication connection shown or discussed may be an indirect coupling or communication connection by means of some interfaces, devices or units, and may be in an electrical, mechanical or other forms.

The units described as separate components may or may not be physically separated, and the components displayed as units may or may not be physical units, that is, such components may be located in one place or may be distributed to multiple network units. Some or all of the units may be selected according to actual needs to achieve the objectives of the embodiments of the present disclosure.

In addition, functional units in each embodiment of the present disclosure may be integrated into one processing unit, or such units may exist physically separately, or two or more units may be integrated into one unit.

The function may be stored in a computer readable storage medium if same is implemented in the form of a software functional unit and sold or used as a standalone product. On the basis of such understanding, the technical solution of the present invention may be embodied in the form of a software product essentially, or a part, contributing to the prior art, of the technical solution or a part of the technical solution may be embodied in the form of a software product. The computer software product is stored in a storage medium, including multiple instructions for causing a computer device (which may be a personal computer, a server, or a network device) to perform all or part of the steps of the methods described in various embodiments of the present disclosure. The storage medium includes various media that may store program codes, such as a USB flash drive, a mobile hard disk, a ROM, a RAM, a magnetic disk or an optical disk.

The contents above are only specific implementations of the present disclosure, and the scope of protection of the present disclosure is not limited thereto, and those skilled in the art could easily conceive of changes or substitutions within the technical scope of the present disclosure. Such contents should be covered by the scope of protection of the present disclosure. Therefore, the scope of protection of the present disclosure should be subject to the scope of protection of the claims.

What is claimed is:

1. An updating method, applied to a control node in a distributed storage system, the distributed storage system comprising the control node, a first data node, a file system, and a third party node, the control node storing authority information stored on the first data node, the method comprising:
   acquiring updated authority information from a user, comprising: receiving an update request from the user, the update request comprising the updated authority information;
   updating a memory of the control node according to the update request, and transmitting a second update notification to the file system in the distributed storage system for updating the file system;
   in response to the control node updating the memory of the control node successfully and the file system being updated successfully, transmitting a first update notification to the first data node, the first update notification comprising the updated authority information;
   in response to not receiving an update result returned by the first data node, or receiving an update result returned by the first data node and the update result being an update failure, determining whether the third party node comprises a registration message transmitted within a preset time by the first data node; and
   in response to the third party node not comprising the registration message transmitted within the preset time by the first data node, acquiring the authority information stored on the first data node from the control node, storing the acquired authority information onto a second data node, and deleting the first data node.

2. An updating method, applied to a data node in a distributed storage system, the distributed storage system comprising a control node, the data node, a file system, and a third party node, the control node storing authority information stored on the data node, wherein the data node transmits a registration message to the third party node every first preset time, and the method comprises:
   receiving a first update notification from the control node, the first update notification comprising updated authority information, wherein the first update notification is sent from the control node in response to the control node updating the memory of the control node successfully and the file system being updated successfully;
   updating according to the first update notification, and transmitting an update result to the control node, for the control node to store the authority information stored on the data node onto a second data node in response to determining that the third party node does not comprise the registration message transmitted within the preset time by the first data node.

3. The method according to claim 2, wherein the distributed storage system further comprises a file system, and the method further comprises:
   inspecting the file system in the distributed storage system every second preset time, to confirm whether there is updated authority information; and
   in response to there being updated authority information in the file system, loading the updated authority information.

4. A terminal, the terminal being a control node in a distributed storage system, the distributed storage system comprising the control node, a first data node, a file system, and a third party node, the control node storing authority information stored on the first data node, the terminal comprising:
   at least one processor; and
   a memory storing instructions, the instructions when executed by the at least one processor, cause the at least one processor to perform operations, the operations comprising:
   acquiring updated authority information from a user, comprising: receiving an update request from the user, the update request comprising the updated authority information;
   updating a memory of the control node according to the update request, and transmitting a second update notification to the file system in the distributed storage system for updating the file system;
   in response to the control node updating the memory of the control node successfully and the file system being updated successfully, transmitting a first update notification to the first data node, the first update notification comprising the updated authority information;
   in response to not receiving an update result returned by the first data node, or receiving an update result returned by the first data node and the update result being an update failure, determining whether the third party node comprises a registration message transmitted within a preset time by the first data node; and
   in response to the third party node not comprising the registration message transmitted within the preset time by the first data node, acquiring the authority information stored on the first data node from the control node, storing the acquired authority information onto a second data node, and deleting the first data node.

5. A terminal, the terminal being a data node, comprising:
   at least one processor; and
   a memory storing instructions, the instructions when executed by the at least one processor, cause the at least one processor to perform operations of the updating method according to claim 2.

6. The terminal according to claim 5, wherein after the updating according to the first update notification, the operations further comprise:

transmitting an update result to the control node; and transmitting a registration message to a third party node every first preset time.

7. The terminal according to claim 5, wherein the operations further comprise:

inspecting a file system every second preset time to confirm whether there is updated authority information; and loading the updated authority information, in response to there being updated authority information in the file system.

8. A non-transitory computer readable storage medium storing a computer program, wherein the computer program, when executed by a processor, implements the updating method according to claim 1.

9. A non-transitory computer readable storage medium storing a computer program, wherein the computer program, when executed by a processor, implements the updating method according to claim 2.

\* \* \* \* \*